(12) United States Patent
Zedda et al.

(10) Patent No.: US 6,606,580 B1
(45) Date of Patent: Aug. 12, 2003

(54) FAULT DIAGNOSIS

(75) Inventors: Marco Zedda, Florence (IT); Ankush Gulati, Bucks (GB); Ritindar Singh, Cranfield (GB)

(73) Assignee: Rolls Royce, PLC, London (GB)

( * ) Notice: Subject to any disclaimer, the term of this patent is extended or adjusted under 35 U.S.C. 154(b) by 335 days.

(21) Appl. No.: 09/592,296

(22) Filed: Jun. 12, 2000

(30) Foreign Application Priority Data

May 9, 2000 (GB) .............................................. 0011184

(51) Int. Cl.⁷ ................................................. G06F 9/00
(52) U.S. Cl. ....................... 702/185; 702/182; 702/183; 702/186; 702/188
(58) Field of Search ................................ 702/123, 179, 702/182, 183, 185, 186, 188; 705/8; 712/227

(56) References Cited

U.S. PATENT DOCUMENTS

| | | | |
|---|---|---|---|
| 5,633,800 A | 5/1997 | Bankert et al. | 364/474.194 |
| 5,897,629 A | 4/1999 | Shinagawa et al. | 706/13 |
| 6,038,540 A * | 3/2000 | Krist et al. | 705/8 |
| 6,119,075 A * | 9/2000 | Dean et al. | 702/186 |
| 6,163,840 A * | 12/2000 | Chrysos et al. | 712/227 |
| 6,418,398 B1 * | 7/2002 | Duek et al. | 702/181 |

FOREIGN PATENT DOCUMENTS

| | | | |
|---|---|---|---|
| WO | WO 91/14990 | 10/1991 | G06F/15/18 |

OTHER PUBLICATIONS

A J Volponi, "Sensor error compensation in engine . . . " ASME Paper 94–GT–58.

L A Urban et al. "Mathematical Methods of relative engine . . . " SAE Paper 922048.

D L Doel "An assessment of weighted–least–squares gas path analysis" ASME Paper 93–GT–119.

D L Doel "Temper: Gas–path analysis tool for commerical jet engines" ASME Paper 92–GR–315.

K Deb et al. "Multiobjective Optimization using nondominated . . . " Journal of Evolutionary Computation 1994, 2(3), MIT.

A Stamatis et al. "Jet engine fault detection with differential . . . " ISABE 89–7133.

R Eustace "Neural Network fault diagnosis . . . " ISABE 93–7091.

R Eustace et al. "Fault diagnosis of fleet engines . . . " ISABE 95–7085.

M Zedda et al. "Fault Diagnosis of a turbofan engine . . . " AIAA 98–3602.

* cited by examiner

*Primary Examiner*—Marc S. Hoff
*Assistant Examiner*—Felix Suarez
(74) *Attorney, Agent, or Firm*—Oliff & Berridge, PLC

(57) ABSTRACT

Methods and systems for fault diagnosis are described. The methods are in particular, although not necessarily exclusively, for the detection of faults in multi-component systems, typically power plant, whose performance is characterised by a series of indirectly measurable performance parameters. The methods proposed are based on "optimisation techniques", involving the optimisation of an objective function to obtain an estimate of performance parameters and operating parameters. In one aspect, a method is proposed that takes account of measurement biases. In another aspect, a method for optimising an objective function is proposed, which adopts a unique Evolution Program approach in which a population of possible solutions is sub-divided into a number of groups.

20 Claims, 3 Drawing Sheets

LAYOUT OF THE DIAGNOSTIC SYSTEM

LAYOUT OF THE DIAGNOSTIC SYSTEM

FIG. 1

SENSOR VALIDATION FOR A SIMPLE SYSTEM

FIG. 2

CHECK ON THE MEASUREMENTS SUPPOSED TO BE BIASED

FIG. 3

SCHEMATIC OF THE AEROTHERMODYNAMIC MODEL OF A TWO-SPOOL TURBOFAN

FIG. 4

$$X = \begin{bmatrix} \Delta\Gamma_{FAN} \\ \Delta\eta_{FAN} \\ \Delta\Gamma_{HPC} \\ \Delta\eta_{HPC} \\ \Delta\Gamma_{HPT} \\ \Delta\eta_{HPT} \\ \Delta\Gamma_{LPT} \\ \Delta\eta_{LPT} \\ \Delta C_D \end{bmatrix} = \begin{bmatrix} 0 \\ 0 \\ -3 \\ -2 \\ 0 \\ 0 \\ 0 \\ 0 \\ 0 \end{bmatrix}$$

FAULT CLASS "HPC"

$$X = \begin{bmatrix} \Delta\Gamma_{FAN} \\ \Delta\eta_{FAN} \\ \Delta\Gamma_{HPC} \\ \Delta\eta_{HPC} \\ \Delta\Gamma_{HPT} \\ \Delta\eta_{HPT} \\ \Delta\Gamma_{LPT} \\ \Delta\eta_{LPT} \\ \Delta C_D \end{bmatrix} = \begin{bmatrix} 0 \\ 0 \\ 0 \\ 0 \\ -3 \\ -1 \\ -2.5 \\ -3 \\ 0 \end{bmatrix}$$

FAULT CLASS "HPT-LPT"

EXAMPLES OF FAULT CLASSES

EFFECT OF THE NUMBER OF MEASUREMENTS ON RELATIVE REDUNDANCY

FIG. 7

FAULT DIAGNOSIS

FIELD OF THE INVENTION

This invention relates to methods and systems for fault diagnosis, in particular, although not necessarily exclusively, for the detection of faults in multi-component systems, typically power plant, whose performance is characterised by a series of indirectly measurable performance parameters. One specifically envisaged application of the invention is the detection and quantification of faults in a gas turbine.

BACKGROUND

Analysis of the performance of gas turbines is important for both testing of development engines and condition monitoring of operating engines. In particular, the ability to accurately and reliably identify the component or components responsible for loss of performance would be particularly beneficial. However, the nature of a gas turbine means there are inherent problems to be addressed if this is to be achieved in practice.

In common with other power plant, a gas turbine's performance can be expressed in terms of a series of performance parameters for the various components of the system. Typically, those chosen to characterise the performance of a gas turbine would be the efficiency and flow function of compressors and turbines and the discharge coefficient of nozzles. Significantly, these performance parameters are not directly measurable. They are, however, related to measurable parameters, such as spool speeds, averaged pressures and temperatures, thrust and air flows, and any loss in performance of a component will be reflected by changes in these measurable parameters (referred to hereinafter as "measurement parameters").

Given a particular operating point, typically defined by environmental conditions and a power setting (inlet temperature and pressure, and fuel flow for example), or other such operating parameters, the relationship between measurement parameters and performance parameters can be represented, for example, in a performance simulation model describing the aerothermodynamics of the gas turbine's components. In principle this enables the performance parameters, and more importantly changes in them from respective reference values, to be calculated. In turn, it should be possible, from these calculated values, to detect a drop in the performance of one or more components and hence deduce the cause of a loss in performance.

In practice, however, it has been found difficult to accurately and reliably relate the calculated changes in performance parameters to the presence of faults in specific components, particularly when only a small number of engine components are faulty. This is due at least in part to the non-linearity of the relationship between the measurement parameters and the performance parameters.

There are, however, a number of further obstacles to this diagnostic task. In particular, sensors used to collect the measurement parameters necessarily work in a harsh operating environment. This leads to large measurement noise and a high probability of systematic errors (i.e. biases) in the sensor suite. The same problems affect the measured operating parameters (e.g. environment and power setting parameters). To be effective a diagnostic method has to be able to account for these measurement uncertainty effects.

SUMMARY OF THE INVENTION

It is a general object of the present invention to provide methods and systems for processing data relating to the performance of systems having a number of distinct components, with the aim of detecting "faults" in the components of the system and/or the measurements taken to collect the data from the system.

The term "fault" is used here and in the following to refer to deviations in performance parameters associated with the components from expected, or reference values, often referred to as base line values, as well as errors in measured values arising from measurement biases. Aspects of the present invention are concerned with the detection of both of these forms of "fault".

A further object is the isolation of a faulty component or faulty components in a system and quantification of the loss in performance. In this respect, the identification of faulty measurements (i.e. measurement biases) can be important because they may result in false indications of the values of associated performance parameters. The invention is particularly useful in the detection of faults in only a small number of components (eg. 1, 2 or 3), rather than faults in a large number of components as might be expected as an engine slowly deteriorates in service.

These and other objects and aspects of the invention will be apparent from the detailed description and examples below.

DETAILED DESCRIPTION

The methods proposed by the present are based on what might generally be referred to as an "optimisation technique", based on the optimisation (typically the minimisation) of an objective function to obtain an estimate of the performance parameters and the operating parameters. It is useful, therefore, to first consider a more conventional approach to this optimisation, before considering the application of this technique to the problem that the present invention is aimed at addressing.

Taking a multi-component system whose performance can be expressed in terms of a series of performance parameters, which can in turn be related to measurement parameters, the relationship between the performance and measurement parameters can be expressed as $$z = h(x,w) + b + v$$

where:

$z \in R^M$ is the measurement parameter vector and M is the number of measurement parameters;

$x \in R^N$ is the performance parameter delta vector (i.e. relative variation of the performance parameters with respect to a base line or reference value) and N is the number of performance parameters;

w ∈ $R^P$ is the operating parameter vector (i.e. the vector of actual environment and power setting parameters representing the operating condition of the system) and P is the number of operating parameters;

h( ) is a vector-valued function (which in many cases will be a non-linear function) representing the relationship between the performance parameters and the measurement parameters;

b is a measurement bias vector; and v is a measurement noise vector.

The measured values of the environment parameters will also be liable to be affected by noise and biases, giving:

$$u = w + b_w + v_w$$

where:

u is the vector of measured values of the operating parameters;

$b_w$ is the vector of biases on these measured values; and $v_w$ is the vector of noise on these measured values.

An appropriate objective function for minimisation might be:

$$J(\underline{x}, \underline{w}) = \sum_{j=1}^{M} \frac{|z_j - h_j(\underline{x}, \underline{w})|}{z_{odj}(\underline{w}) \cdot \sigma_j}$$

where:

$z_{odj}(w)$ is the value of the j-th measurement (i.e. the j-th element of the measurement parameter vector) in the 'off design', undeteriorated condition; and $\sigma_j$ is the standard deviation of the j-th measurement. Noise is assumed to have a gaussian probability density function (pdf), however discrepancies from this model are likely to exist. It is for this reason that absolute values are used in the proposed objective function, rather than the more conventional use of squares, because absolute values give better robustness. The use of absolute values also provides better robustness to modelling errors, eg during the simulation of gas turbine performance discussed below. Where this robustness is not required, squared values can be used.

This objective function (J) is a measure of the consistency between actual measurements taken from the system, that is to say measured values of the measurement parameters (z), and calculated values of the measurement parameters, calculated by employing function h( ), which will typically be embodied in a performance simulation model.

Minimisation of the objective function (J) gives estimated values for the performance and operating parameters (x,w). A variety of techniques exist for minimisation of the objective function and need not be explained in detail here. One preferred approach is to use a Genetic Algorithm (GA), described in more depth further below. This and other optimisation techniques will generally involve multiple evaluations of the objective function before a minimum (or otherwise optimum) solution is found.

A simple comparison between estimated values of the performance parameters obtained in the above manner and the reference, or base line values for the performance parameters can then in principle reveal loss of performance and hence potential faults. However, in this approach, although reference to the standard deviation of the measurements provides some allowance for noise, no account is taken of possible measurement biases in one or more of the M measurement parameters. In practice, this basic approach does not therefore lead to satisfactory estimation of the performance parameters and consequently does not enable the accurate identification of faulty components of the system.

Detecting Faulty Measurement Parameters (Measurement Biases)

In one of its aspects, the invention proposes a modified approach in which measurement biases are taken into account in the optimisation (e.g. minimisation) of the objective function.

Accordingly, in a first aspect, the invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system, the method comprising:

selecting a maximum number $M_{bias}$ of fault affected (i.e. biased) measurements, optimising an objective function J(x,w) that gives a measure of the consistency between measured values of the measurement parameters z collected from the system and calculated values of the measurement parameters calculated using said function of the performance parameters and the operating parameters h(x,w), said optimisation including multiple evaluations of the objective function J(x,w), each time the objective function J(x,w) is evaluated during said optimisation, the method comprising calculating a plurality of possible values for the objective function, each possible value being calculated by determining the objective function with a different $M_{bias}$ of the measurement parameters eliminated, the value of the minimum one of said plurality of calculated possible values being assigned as the value of the objective function.

The optimisation of the objective function is preferably achieved using a Genetic Algorithm or other 'Evolutionary' optimisation technique, most preferably adopting the approach described below in connection with the second aspect of the present invention.

As already suggested above, the 'function' relating the measurement parameters to the performance and operating parameters can conveniently be embodied in a performance simulation model designed to simulate the performance of the system to which the method is applied. The calculated values of the measurement parameters can then be calculated using the model.

The method is based on the recognition that the presence of a bias in a measured value of a measurement parameter will introduce an inconsistency between the measured value itself and the value for the measurement parameter calculated using the function h(x,w) relating the performance and measurement parameters. Since the objective function, for example $$J(x, \underline{w}) = \sum_{j=1}^{M} \frac{|z_j - h_j(x, \underline{w})|}{z_{odj}(\underline{w}) \cdot \sigma_j}$$

is a measure of the consistency between these measured and calculated values, this inconsistency will manifest itself with larger values of the objective function.

If the biased measurements are eliminated when evaluating the objective function, the terms in the objective function regain their consistency and the optimised value of the objective function becomes low.

In the present method, the identity of the faulty sensors giving rise to the biassed measurements is unknown, the only assumption being the maximum likely number of faulty sensors, $M_{bias}$. It is for this reason that the objective function is evaluated by calculating its value a plurality of times with different ones of the measurement parameters eliminated. Specifically, in each calculation the number of measurement parameters eliminated corresponds to the maximum likely number of biassed measurements $M_{bias}$. For instance, if we take $M_{bias}$ to be 2, two measurement parameters, say k and l, are eliminated for each calculation of the value of the objective function, giving us:

$$J_{k,l}(x, \underline{w}) = \sum_{\substack{j=1 \\ j \neq k,l}}^{M} \frac{|z_j - h_j(x, \underline{w})|}{z_{odj}(\underline{w}) \cdot \sigma_j}$$

In this way, if the calculations are conducted so as to systematically eliminate all possible combinations of the maximum number of biassed measurement parameter values (i.e. all possible combinations of k and l in the above example), at least one of the calculated values, namely the lowest value, can be assumed to have been arrived at without using any of the biassed measurement parameters. That is to say the value assigned to the objective function in the above example would be:

$$J(x, \underline{w}) = \min_{k,l} J_{k,l}(x, \underline{w})$$

In general, therefore, the number of times Q that the objective function $J(x,w)$ must be calculated each time it is evaluated is equal to the possible number of combinations of the biassed measurement parameters:

$$Q = \binom{M}{M_{bias}} = \frac{M!}{M_{bias}!(M - M_{bias})!}$$

The assumption that only a limited number of the sensors in the complete sensor suite will be subject to bias has been found to be acceptable in practice. For example, in a typical suite of sensors used for evaluating the performance of a gas turbine engine on a test bed it would be unusual for any more than one or two of the sensors to be faulty.

Significantly, this approach for addressing the issue of measurement biases is only suited to systems in which there is a redundancy in the measurement parameters. That is to say that the number of measurement parameters used in the evaluation of the objective function (i.e. the total number of measurement parameters less the number of parameters eliminated when evaluating the objective function) must be greater than the total number of operating parameters plus the assumed number of fault affected performance parameters (i.e. those values of x in the objective function having a non-zero value) in the system, these being the unknown variables to be estimated. This constraint on the method applies because if the number of measurement parameters employed in evaluating the objective function is equal to the number of unknown variables, there is no redundancy in the parameters to give rise to the inconsistency from which the sensor fault can be identified.

So, in general terms it can be said that the method will not be applicable unless the following inequality holds:

$$M - M_{bias} > N_{perf} + P$$

where:

$N_{perf}$ is the assumed number of fault effected performance parameters.

It should also be noted that for the approach to be successful at the limit of this inequality it must hold that the $N_{perf} + P$ parameters to be estimated are a function of the $M - M_{bias}$ remaining measurement parameters. Thus, the more redundancy there is in the measurement parameters the greater the chances of a successful outcome to the optimisation. In this sense, the inequality given above might be described as defining a condition which is necessary but not always sufficient.

An alternative way of expressing this inequality for determining the applicability of the system is to define a relative redundancy index R as:

$$R = \frac{M - M_{bias}}{N_{perf} + P}$$

whereby the inequality to determine the applicability of the method becomes:

$$R > 1$$

It also follows that the higher the value of R the greater the applicability of the method.

Adopting this modified approach for the optimisation, e.g. minimisation, of the objective function therefore enables an accurate estimate of the system's performance parameters to be achieved, by taking into account measurement biases. It is also possible, using the method, to identify the faulty sensors themselves and, if desired, to replace their associated measured values of the measurement parameters with better estimates of the true values of those parameters.

Optimisation of the Objective Function

In a second aspect, the invention proposes an Evolution Program (EP) based optimisation technique suitable for optimisation of the objective function discussed above in connection with the first aspect of the invention, although this aspect of the invention has wider applicability also.

Evolution programs (EPs), of which Genetic Algorithms (GAs) are probably the best known example, are now a popular approach to solving problems involving complex, typically non-smooth functions. They therefore lend themselves to the evaluation of the multi-component systems with which the present invention is principally concerned. In particular they can be applied to the problem of optimising, for instance minimising the objective function $J(x,w)$, in order to estimate values for the performance parameters x and operating parameters w based on the measured values of the measurement parameters z.

EPs, including GAs, are in effect search algorithms based on the mechanics of natural selection. A population of possible solutions to a problem, each represented by a string of information, is initially created. Each of these possible solutions is evaluated to determine its 'fitness', in effect the likelihood that it is close to the correct solution. A second generation population of possible solutions is then created based on a combination of a principal of survival of the fittest among the strings ("selection") with a structured yet random exchange of information between the strings ("cross-over") and alteration of information within the strings ("mutation") with the aim of imitating some of the innovative flair of a human approach. This process is repeated for a number of generations until the population of solutions converges to (or hopefully at least towards) the correct solution.

To take the example of the objective function introduced above in connection with the first aspect of the invention, $$J_{k,l}(x, \underline{w}) = \sum_{\substack{j=1 \\ j \neq k,l}}^{M} \frac{|z_j - h_j(x, \underline{w})|}{z_{odj}(\underline{w}) \cdot \sigma_j}$$

the first generation population of a GA (or other EP) would comprise a series of strings, each string representing one 'guess' at the values of the performance parameters x and operating parameters w. The objective function would then be evaluated for each string in the population and a fitness value assigned to each string on the basis of the respective value assigned to the objective function—a low value of the objective function indicates the likelihood of a better estimate of the parameters and hence a higher fitness is assigned.

A second generation of strings is then created, the fitter strings from the first generation having the better chance of surviving to the second generation is through a process of selection. The strings selected for the second generation will also be subjected to cross-over and mutation. Cross-over occurs between randomly selected pairs of strings, in which for instance a random position is selected along the length of the strings and all values of the elements (i.e. the performance and/or operating parameters) in the strings after that position are swapped with one another. In mutation single strings are randomly selected and one or more elements of the selected strings are mutated, for example by the addition of a randomly generated number.

Various forms of these three operators, selection, cross-over and mutation used in GAs, or more generally EPs, will be well known to the skilled person and need not be explained in any more detail here.

The second aspect of the present invention is concerned with a uniquely constrained form of this EP/GA based approach to optimisation of the objective function. Specifically, it is proposed to assume a limit to the maximum number of fault affected components in the system, which in turn defines a maximum number of fault affected performance parameters (i.e. those parameters that define the performance of the fault affected components). This assumption is then used to constrain, in a structured way, both the initial generation of the population used in the EP/GA and the creation of subsequent generations using the selection, cross-over and mutation operators.

More specifically, the strings in the initial population are categorised to form sub-populations which will be referred to as "fault classes", each fault class representing one possible outcome in terms of faulty components. To take the very simple example of a three component system, and the assumption that a maximum of one component can be faulty, there would be three fault classes, one for a fault in each component. If it were assumed that a maximum of two components can be faulty, there would be three additional fault classes representing the possible combinations of faulty pairs of the three components.

In the initial creation of the strings, the values assigned to their elements representing estimated values of the performance parameters x (preferably expressed as delta values, that is to say a percentage variation from the undeteriorated base line values) are constrained in accordance with the fault class to which the string belongs. Thus, only the performance parameters associated with the fault affected component or components of the fault class are allowed to vary from the base line values (i.e. be non-zero in the preferred case of delta values).

In the creation of subsequent generations of strings during the progress of the EP/GA optimisation, the selection operator is allowed to operate across the whole population, so that all of the fault classes compete with one another as is desired.

On the other hand, where the cross-over operator is used it is constrained to operate on pairs of strings selected from the same fault class. In this way the fault classes do not pollute one another with inappropriate fault affected parameters, as would be the case if cross-mating occurred between fault classes.

Similarly, the mutation operator is constrained to prevent pollution of the fault classes with fault affected performance parameters not associated with the fault affected components of the class. This is achieved by constraining the mutation operator so that it does not operate on string elements representing performance parameters other than those performance parameters associated with the fault affected components within a class.

Accordingly, in its second aspect, the present invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system, the method comprising:

optimising an objective function J(x,w) which gives a measure of the consistency between measured values of the measurement parameters z collected from the system and calculated values of the measurement parameters calculated using said function of the performance parameters and the operating parameters h(x,w), said optimisation being an Evolutionary Program based, preferably a Genetic Algorithm based, method comprising the steps of:

(a) creating an initial population of strings, each string comprising a plurality of elements corresponding to the performance parameters x and operating parameters w, values being assigned to the string elements representing estimated values of said parameters;

(b) evaluating the objective function for each of the strings in the population and, on the basis of this evaluation, assigning a fitness value to each string; and (c) creating a next generation population of strings using a selection operator and at least one of a cross-over operator and a mutation operator, the selection operator employing the assigned fitness values to determine the strings that survive to the next generation;

wherein at the outset of the method an assumed maximum number of fault affected components is set and, based on this, a series of fault classes defined corresponding to possible outcomes in terms of faulty components;

each of the strings of the initially created population being assigned to one of the fault classes, the values assigned to the elements of strings in a fault class representing performance parameters being constrained to only indicate fault affected values for performance parameters defining the performance of the respective fault affected component or components of the class; and during creation of subsequent generation populations, the cross-over operator, if used, being constrained to operate on pairs of strings from the same fault class, and the mutation operator, if used, being constrained so that it does not operate on string elements representing performance parameters other than those performance parameters associated with the fault affected components within a class.

Thus, when creating the next generation, selection may be carried out across the whole population, to create competition between the fault classes. By constraining cross-over and mutation in the manner defined, however, the integrity of each fault class is retained.

Typically, a number of further iterations around steps (b) and (c) of the optimisation process will be required to achieve convergence.

Adopting this constrained approach, it has been found that the population often quite rapidly converges towards solutions (i.e. strings) within a single one of the fault classes, corresponding to the actual fault affected component or components. The method of this aspect of the invention therefore provides a very useful tool for detecting which components of the multi-component system are faulty. If it is also desired to estimate the actual deterioration of the faulty components, the competition is continued, that is to say further iterations of the optimisation process are executed, within the dominant fault class until the population converges further towards a string representing the best estimate of actual performance and operating parameters. In this way, it is possible to quantify the loss of performance in the faulty components.

If desired, the power of the search carried out by the Evolution Program approach proposed above, may be improved by supplementing it with what might be termed a local search or optimisation algorithm. One suitable form local search algorithm that can be used for this purpose are so called Evolution Strategies (ES), described for example in Michalewicz, Z., 1996: "Genetic Algorithms+Data Structures=evolution programs", Springer Verlag, 3rd Edition, incorporated herein by reference.

The proposed optional enhancement to the present invention is to employ a local search algorithm, such as an ES, to periodically refine the better strings in each fault class of the population. For example, the best m strings in fault class might be used to initialise a series of ES (one for each fault class) every n iterations (i.e. generations) of the GA (or other EP). The ES are run starting from these initial values for a fixed number of iterations. If the final solutions given by an ES are better (i.e. result in lower values of the objective function) than the m strings with which the ES was initialised, the strings are substituted with the results of the ES prior to the next iteration of the GA. Typically, m=5 and n=10 would be appropriate to give some enhancement of the method without increasing the computational burden too greatly.

Whilst this aspect of the invention has been discussed in connection with fault detection in multi-component systems, it has wider applicability. Accordingly, in a more general form of the second aspect, there is a provided an Evolution Program based search or optimisation method for solving a problem, comprising the steps of:

(a) creating an initial population of strings, each string representing a possible solution to the problem;

(b) evaluating the problem for each of the strings in the population and, on the basis of this evaluation, assigning a fitness value to each string; and (c) creating a next generation population of strings using a selection operator and at least one of a cross-over operator and a mutation operator, the selection operator employing the assigned fitness values to determine the strings that survive to the next generation;

wherein said strings are categorised at the outset of the method, in accordance with a pre-selected characteristic of said strings, to form a plurality of subpopulations comprising strings of the having the same value of said pre-selected characteristic; and during creation of subsequent generation populations, the cross-over operator, if used, being constrained to operate on pairs of strings from the same subpopulation, and the mutation operator, if used, being constrained to ensure that the strings of each subpopulation retain their initial value of said pre-selected characteristic.

Poorly Instrumented Systems

The constrained approach to optimising the objective function described above (second aspect) has been shown to provide very satisfactory results when the multi-component system under investigation is well instrumented. That is to say, when a relatively large number of measurement parameters can be measured from the system. A typical example of a well instrumented system would be a gas turbine in its development stage.

Problems are encountered, however, when relatively few measurement parameters are available from the system under investigation, such as for example would typically be the case in pass off tests for a gas turbine. The problem is particularly acute when the number of measurements available to evaluate the objective function, taking into account any elimination of parameters through measurement biases is fewer than the number of performance parameters and operating parameters to be estimated.

It has been proposed in the past to address this lack of data by using measurements from a plurality of operating points to extract additional data from the limited set of sensors. Such a multiple operating point analysis (MOPA) is described, for instance, in Stamatis, A., Papaliou, K. D., 1988: "Discrete operating condition gas path analysis", AGARD Conference Preprint Nr 448, Quebec, Canada, incorporated herein by reference. However, the solution of a problem relying on MOPA is significantly more complex than a single operating point approach, due to the larger number of operating parameters that must be accounted for and the added level of complexity introduced to the objective function, making its optimisation difficult to achieve when employing known techniques.

However, by using a MOPA approach in combination with the constrained optimisation approach set forth above in connection with the second aspect of the invention, satisfactory results have now been achieved.

In a third aspect, the invention therefore proposes a modified approach based on the second aspect of the invention, which modified approach uses measurement parameters taken from the system at a plurality of operating points in order to estimate the performance and operating parameters and thus identify the fault affected components of the system and/or biassed measurements.

An underlying assumption for this approach to work is that the values of the fault affected performance parameters (i.e. the delta values in the preferred approach) do not vary between the selected operating points. For this reason it is desirable to select the operating point to be relatively close to one another, although they must not be too close otherwise the measurement parameters at the selected operating points become indistinguishable and the benefits of the MOPA approach are lost.

In one form, it is proposed to optimise, for instance minimise, a modified objective function, which represents a combination of individual objective functions for the respective operating points. The combination may, for example, be a simple summation of the individual objective functions or, alternatively, the product of these functions or some other appropriate combinatorial function.

Taking the example of a summation, one exemplary objective function for the optimisation would be:

$$J_{k,l}(\underline{x}, \underline{W}) = \sum_{i=1}^{L} \sum_{\substack{j=1 \\ j \neq k,l}}^{M} \frac{|z_j^{(i)} - h_j(\underline{x}, \underline{w}^{(i)})|}{z_{odj}(\underline{w}^{(i)}) \cdot \sigma_j}$$

or taking the example of a product, an exemplary objective function would be:

$$J_{k,l}(\underline{x}, \underline{W}) = \prod_{i=1}^{L} \sum_{\substack{j=1 \\ j \neq k,l}}^{M} \frac{|z_j^{(i)} - h_j(\underline{x}, \underline{w}^{(i)})|}{z_{odj}(\underline{w}^{(i)}) \cdot \sigma_j}$$

where:

$$\underline{W} = \begin{matrix} \underline{w}^{(1)} \\ \underline{w}^{(2)} \\ \vdots \\ \underline{w}^{(L)} \end{matrix}$$

is a vector of the operating parameters $\underline{w}$ for the L operating points at which measurement parameters z are measured. The vector $z^{(i)}$ representing the measurement parameters for the i-th operating point, at which the operating parameters are $w^{(i)}$.

In the illustrated example, account is also taken of two possible measurement biases (k,l) in accordance with the first aspect of the invention. Thus, the value assigned to the combined objective function when it is evaluated will be:

$$J(\underline{x}, \underline{W}) = \min_{k,l} J_{k,l}(\underline{x}, \underline{W})$$

Since the optimisation task is significantly harder for this MOPA approach in comparison to the single operating point approaches already discussed, the local search enhancement using for example an ES is particularly preferred here.

As with the single operating point analysis, it is possible to define a relative redundancy index R for this MOPA approach as follows:

$$R = \frac{L \cdot (M - M_{bias})}{N_{perf} + L \cdot P}$$

where for the described MOPA approach to be applicable, as before, R>1. For the reason explained above, this condition can generally be considered necessary, but not always sufficient, and preferably R>>1.

Another approach to minimise in the multiple operating point aspect of the invention, rather than to adopt a single objective function that is a combination of objective functions for the various operating points, is to carry out a multi-objective minimisation. That is to say, to minimise multiple objective functions, each associated with one of the selected operating points. Put another way, one can consider this approach as the minimisation of a vector whose components are the objective functions of the different operating points. One suitable method for doing this is the pareto-based approach described further below.

The various aspects of the invention discussed above may conveniently be implemented in software, for execution on any appropriate digital computer including one or more memory devices for storing the various data and one or more processors for executing the methods.

Turning now to the figures, embodiments of the invention and examples of its application will be described in more detail.

Figure 1:
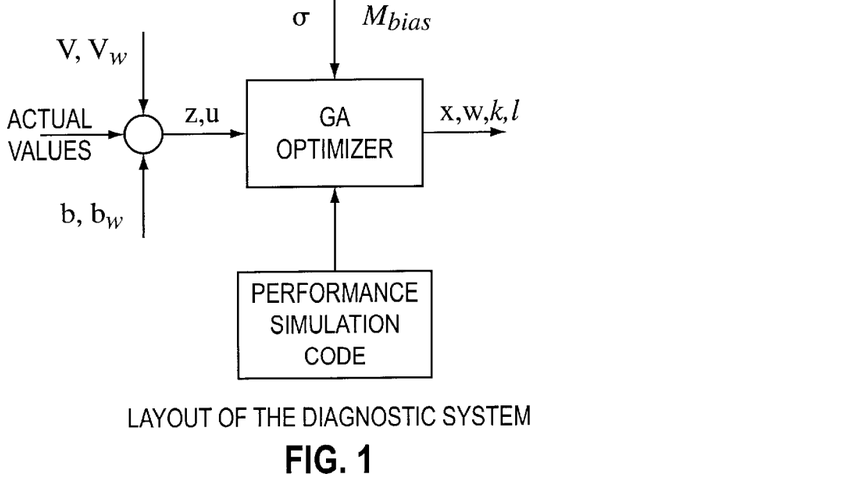
FIG. 1 illustrates the layout of a diagnostic system according to an embodiment of the invention.

FIG. 1 shows the basic layout of a diagnostic system operable in accordance with an embodiment of the present invention. The inputs to the system are the measured values of the measurement parameters z and the measured values of the operating parameters u. The maximum number of biased measurements $M_{bias}$ and the measurement noise standard deviation $\sigma$ are also inputs to the system. The maximum number of fault affected components, and hence the maximum number of fault affected parameters $N_{perf}$ is pre-set in the system in this example.

The system itself comprises a genetic algorithm (GA) based optimiser, which is implemented in software. Embodied in the optimiser is the objective function on which the optimisation is based along with routines to establish the necessary population of solutions, sub-divided into fault classes, and to run the constrained GA to minimise the objective function in the manner already discussed above. The system also comprises a performance simulation model to provide the calculated values of the measurement parameters h(x,w), based on the estimated performance and operating parameters, necessary for evaluation of the objective function.

The output from the diagnostic system, once the optimisation has been completed, are the final estimated values of the performance parameter delta values x (ie. the variation of the performance parameters from base line values) and operating parameters w, along with an identification of the biased measurement parameters k,l.

Figure 2:
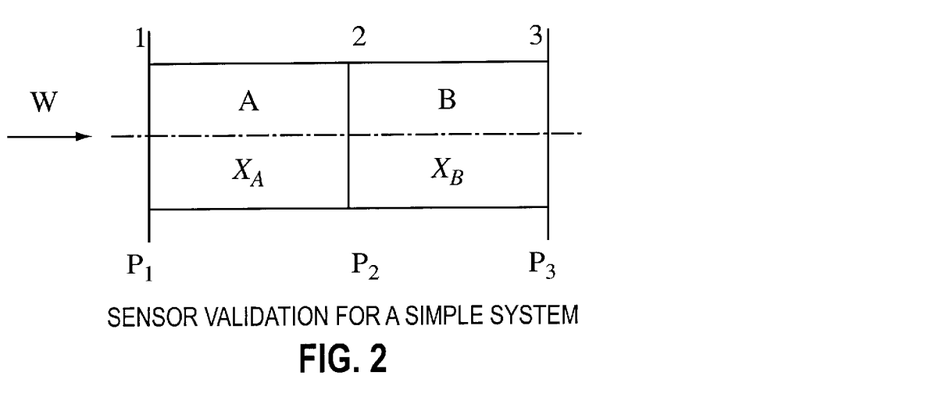
FIG. 2 illustrates a simple system used to exemplify a sensor validation function of the diagnostic system.

With reference to FIG. 2, the manner in which measurement biases can be accounted for (referred to as "sensor validation") will be exemplified.

FIG. 2 illustrates a pipe, which is divided in two parts, A and B. A flow passes through the pipe. Pressures at stations 1, 2 and 3 are measured. The performance of parts A and B is quantified by variables $X_A$ and $X_B$ respectively. The three pressures (P) are known functions of the performance parameters:

$$P_1 = h_1(X_A, X_D) \quad (1)$$

$$P_3 = h_3(X_A, X_B) \quad (2)$$

$$P_2 = h_2(X_A, X_B) \quad (3)$$

An error in $P_2$ is assumed to be present.

The classic approach to calculate the performance parameters would consist of the minimisation of the following objective function:

$$J(X_A, X_B) = \sum_{j=1}^{3} [P_j - h_j(X_A, X_B)]^2 \quad (4)$$

Looking at equations (1) through (3) it can be seen that three equations (one for each measurement) are available to calculate the two performance parameters $X_A, X_B$. There is one redundant equation. If no bias in the measured pressures is present, all three equations are mutually consistent (any one of them can be expressed as combination of the other 2) and so the actual minimum of the chosen objective function (4) (ie. zero) can be reached. If, however, one of the measurements is biased, there is no mutual consistency and then the objective function (4) after optimisation will not reach zero if all measurements are used. This inability to minimise the objective function indicates that there is a sensor problem, but does not identify the faulty sensor. Moreover, the calculation of the performance parameters is likely to be inaccurate because it is based on the faulty pressure measurement.

Application of a sensor validation method in accordance with the first aspect of the invention suggests that the objective function should be:

$$J_i(X_A, X_B) = \sum_{\substack{j=1 \\ j \neq i}}^{3} [P_j - h_j(X_A, X_B)]^2 \quad (5)$$

$$J(\hat{X}_A, \hat{X}_B) = \min_{i, X_A, X_B} J_i(X_A, X_B) \quad (6)$$

However, the method does not work if just 3 measurements are available, because any one of the 3 combinations obtained by elimination of 1 sensor ($P_1$ and $P_2$, or $P_1$ and $P_3$, or $P_2$ and $P_3$) can provide a solution with the objective function equal to zero. This is because when a measurement is not used in the calculation of the objective function there is no redundancy in the remaining set (2 unknowns, 2 equations).

If, however, another measurement is available, which can be related to any of $X_A$ and $X_B$, say $M_3$, then elimination of 1 out of 4 measurements will leave a certain redundancy in the set used in the objective function: 2 unknowns are calculated by using 3 measurements. If the biased measurement is used in the objective function, the resulting inconsistency will produce a larger value of the function, whereas when the biased measurement is excluded the minimised value will be zero. The important thing is that the number of measurements used to build the objective function be larger than the number of parameters to be calculated (at least one more), so that the redundancy enables checking on the self-consistency of the measurement set. This gives rise to the requirement for R>1, where R is the measure of relative redundancy discussed above.

So long as there is adequate redundancy in the equations available for evaluation of the system, the proposed method therefore allows the biased measurement to be eliminated. By doing this, minimisation of the objective function also then provides an accurate estimate of the performance parameters and operating parameters (x,w).

Figure 3:
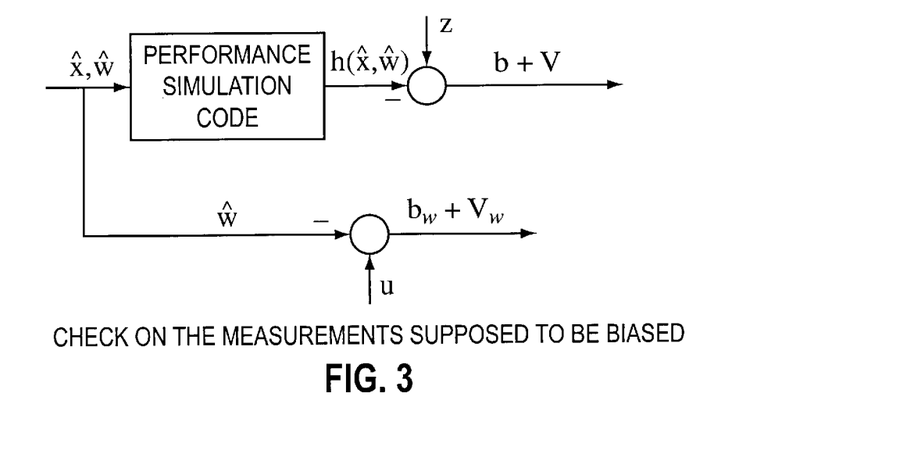
FIG. 3 illustrates use of the simulation model to calculate value of noise and bias.

Once these parameters are established, if desired they can be used, along with the performance simulation model, to obtain an estimate of the combined noise and bias effecting the measured values of the measurement and operating parameters, as indicated in FIG. 3. As can be seen the measured values u of the operating parameters are simply subtracted from the estimated actual values w arrived at after optimisation of the objective function, giving the noise and bias values $b_w, v_w$ for these measurements. To determine the noise a bias values b,v for the measurement parameters, the estimated performance and operating parameters are used as inputs to the performance simulation model to calculate the measurement parameters. These calculated values are then subtracted from the actual measurements to give the noise and bias. If the combined noise and bias value for any parameter is more than can be attributed to noise alone (eg. more than three times the noise standard deviation) a bias is assumed. If desired, for future calculations the biased measurement can then be replaced by an estimated value.

As already discussed above, the preferred form of minimising the objective function is to employ a GA in accordance with the second aspect of the invention. The main features of the preferred GA are:

1) The objective function is a function of the performance parameter vector x and the operating parameter (eg. environment and power setting parameter vector) w.

2) Whereas most GAs use a binary coding of the parameter space, here a real coding is chosen as faster and more accurate convergence can be achieved. The creation of problem specific operators is remarkably simplified as well.

3) Initialisation of the population is guided. As a calculus-based iterative technique for solving a non-linear optimisation problem is more likely to converge successfully if the initial guess it starts with is sufficiently close to the solution being sought, the population of strings is initialised according to the constraint on the maximum number of fault affected components and resulting fault affected performance parameters. In this way various fault classes are generated: in the case where a maximum of two fault affected components are assumed, some of these faults classes will represent faults in a single engine component, others faults affecting two components. These classes are then processed by the three operators described below.

4) The selection operator preferably uses the Stochastic Universal Sampling algorithm (Baker, J. E. 1987: "Reducing bias and inefficiency in the selection algorithm", Proceedings of the Third International Conference on Genetic Algorithms, incorporated herein by reference). Selection is extended to all fault classes, so that iteration after iteration those classes will survive which on average show lower values of the objective function. After a few iterations, the competition is generally over as the whole population is made of a single fault class. Concentration on one or two engine components as the faulty ones is then achieved.

5) The crossover operator is applied to pairs of strings which are members of the same fault class. Crossmating between different fault classes is not allowed.

6) The mutation operator is preferably dynamic, in that size of the random mutations applied to the parameters is exponentially reduced to foster fine convergence to the solution. The operator just modifies the fault-affected parameters for each fault class, so that the constraint on the maximum number of fault affected components is satisfied.

In simple terms, selection extended to the whole population forces concentration on the faulty engine components, while crossover and mutation help selection to refine the solution.

When dealing with GAs, a problem can be the computing power necessary to achieve convergence. Every iteration involves evaluation of the objective function for most of the strings and from the point of view of computing power the main burden is running the performance simulation code (calculating h(x,w) and $z_{od}(w)$). Application of a modified Newton-Raphson method may be useful to reach convergence. The examples described in the next section show that running the GA-based optimiser to convergence is definitely feasible from a computational point of view.

It is also worth noting here that no linearisation is ever done during any stage of the fault diagnosis. The fully non-linear approach provides accurate results, even though estimation is more complicated.

Two final points can be made before looking at an example. First, all GAs perform selection on the basis of the fitness values of the strings. The fitness value F(x,w) is a function of the objective value J(x,w). For the problem at hand, in order to improve the local search capability of the optimiser, the following non-linear mapping is preferred:

$$F(\underline{x}, \underline{W}) = \frac{1}{J(\underline{x}, \underline{w})} \quad (16)$$

Second, as already noted, the initial population is subdivided into fault classes. In the case where two is the maximum number of faulty components there are classes for faults in a single component and classes for faults in two components. The number of strings initially assigned to every fault class should preferably be proportional to the number of varying performance parameters for that class. For instance, taking the example of a gas turbine (see below) the class identifying faults in the HP compressor and turbine should initially be made of a number of strings four times larger than the class identifying faults in the propelling nozzle only, because the former includes variations in four performance parameters (efficiency and flow capacity of HP compressor and turbine) whereas the latter includes variation of a single performance parameter only (nozzle discharge coefficient). However, with this simple initial distribution of strings amongst the fault classes the method may not perform well when presented with faults affecting a single component. Single fault classes are preferably therefore given more observability by increasing the number of strings with respect to the dual fault classes. For instance, assignment of the initial number of strings may be made by applying the bare proportionality criterion and then multiplying the number of strings for single fault classes by a coefficient C. A suitable value of C is 3 for most gas turbine arrangements. The algorithm, though, is not very sensitive to the choice of C.

EXAMPLE 1

Figure 4:
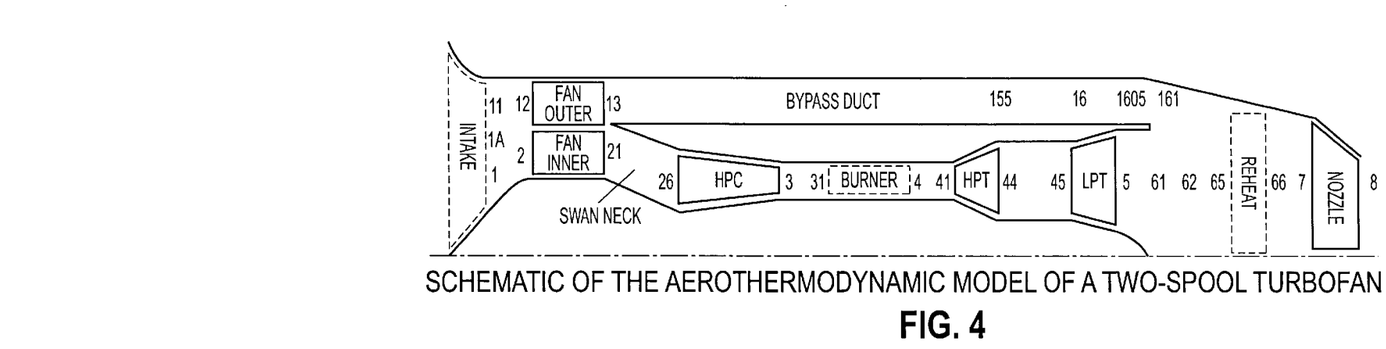
FIG. 4 is a schematic of a gas turbine to which the diagnostic system has been applied by way of example.

The diagnostic method has been tested with simulated data for a low by-pass ratio turbofan, the EJ200, powerplant of the European Fighter Aircraft (EFA2000). A Rolls-Royce accurate non-linear steady state performance simulation model (named RRAP) has been used. The engine is modelled by 6 components illustrated in FIG. 4: inner and outer fan, HP compressor, HP turbine, LP turbine and propelling nozzle, 10 performance parameters are used to monitor the health of the engine components: outer and inner fan efficiency ($\eta_{FANOUT}, \eta_{FANIN}$), overall fan flow function ($\Gamma_{FAN}$), nozzle discharge coefficient ($C_D$), HPC, HPT, LPT efficiencies and flow functions ($\eta_{HPC}, \Gamma_{HPC}, \eta_{HPT}, \Gamma_{HPT}, \eta_{LPT}, \Gamma_{LPT}$). The instrumentation suite available (typical of a test bed) is made of 16 measurements: inlet total pressure and temperature (P1 and T1), spool speeds (NH and NL), outer fan exit total pressure and temperature (P13 and T13), inner fan exit total pressure and temperature (P21 and T21), inner fan mass flow (W21), HP compressor exit total pressure and temperature (P3 and T3), LP turbine exit total pressure and temperature (P5 and T5), main burner fuel flow (WFE), engine inlet airflow (W1A), and thrust (F). P1 and T1 are used to set the ambient condition, WFE is given and thrust is measured. Thus 3 measurements are used to set the operating point and 13 to monitor the engine components. Real measurement noise levels have been used.

In this example 1 or 2 engine components are assumed to be faulty in the presence of 2 or 4 biases affecting the measurements. The 3 environment and power setting parameters (P1,T1,WFE) are both noisy and biased. HP and LP spool speeds are assumed to be unbiased.

This situation is exaggerated, as in practice such a large number of faulty sensors is unlikely in a real test bed. The level of deterioration is defined by the ranges of variation of the performance parameters: a maximum of 3% is allowed. Flow functions are allowed to both increase and decrease (ie. the performance parameter delta values x are constrained to be 0±3), whereas efficiencies are only allowed to decrease (0 to −3).

The biases superimposed on the measurements have purposely been chosen small, because small values are particularly undesirable in that their detection is difficult. Undetected biases can affect the estimation of the performance parameters. The magnitude of the biases has been set to a maximum of 1% for all measurements, apart from those whose assumed measurement non-repeatability range (ie. noise), equal to 3*σ, is comparable to a 1% variation. For these, a maximum level of 2% has been chosen for the bias. The biases affecting the environment and power setting measurements have been set to the large maximum value of 5σ as accommodation is automatically carried out. The GA population is set to 4000 strings and 200 iterations have been found to be sufficient to reach convergence.

The GA is designed to comply with the constraint of the maximum number of fault affected components/performance parameters in the manner discussed above, by defining fault classes. There will be fault classes for single components (inner fan, outer fan, HP compressor, etc.) and also for all possible combinations of two fault affected components (inner fan and outer fan, inner fan and HP compressor, etc). The total number of fault classes in this case, where a maximum of two fault affected components is assumed, where $N_{class}$ is the number of classes and $N_{comp}$ the total number of components, can be calculated as:

$$N_{class} = N_{comp} + \frac{N_{comp}!}{2!(N_{comp}-2)!}$$

where the first term relates to single faulty components and the second term to faults in two components.

Figure 5:
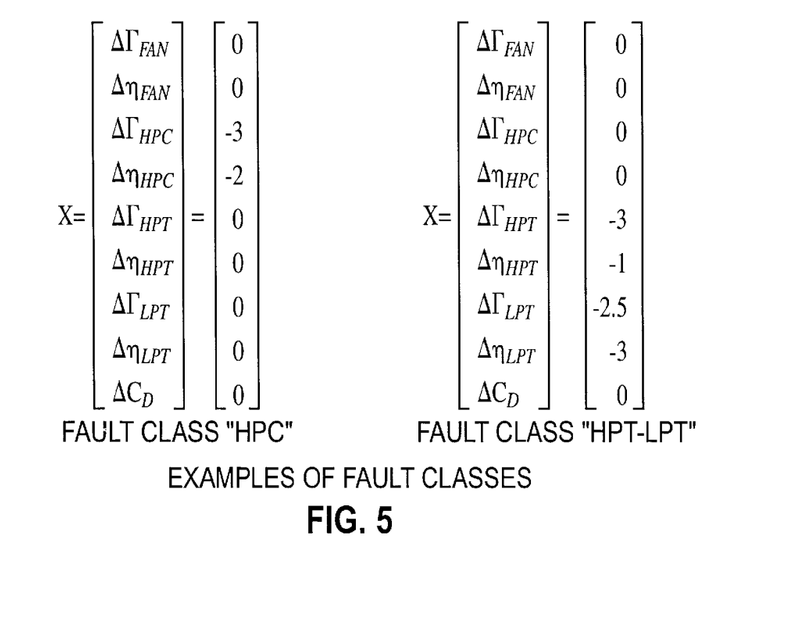
FIG. 5 shows two exemplary strings from specific "fault classes" for the example.

By way of example, FIG. 5 illustrates two possible strings from the GA population. The first is a member of the fault class "HPC" for single faults in the HP compressor. It can be noted that the only non-zero performance parameters are those for HPC efficiency and flow function (the non-zero values represent deviations from base line values). The second string is from the fault class "HPC-LPT"—representing two faults, one in the HP compressor and the other in the LP turbine. The parameters characterising the performance of all other components are zero.

During optimisation of the objective function, the constraints placed on the cross-over and mutation operators (see above) ensure that, although the values for the fault affected parameters may be modified, the zero values, ie. those for the non-faulty performance parameters, will remain zero from generation to generation. In this way, the fault classes are maintained throughout the optimisation.

To account for measurement biases, the optimisation employs an objective function according to the first aspect of the invention, namely $$J_{k,l}(\underline{x}, \underline{w}) = \sum_{\substack{j=1 \\ j \neq k,l}}^{M} \frac{|z_j - h_j(\underline{x}, \underline{w})|}{z_{odj}(\underline{w}) \cdot \sigma_j}$$

$$J(\underline{x}, \underline{w}) = \min_{k,l} J_{k,l}(\underline{x}, \underline{w})$$

where 2 biased measurements are assumed, and where 4 biased measurements are assumed

TABLE 1 comparison in a 2 faulty components test case $$J_{k,l,m,n}(\underline{x}, \underline{w}) = \sum_{\substack{j=1 \\ j \neq k,l,m,n}}^{M} \frac{|z_j - h_j(\underline{x}, \underline{w})|}{z_{odj}(\underline{w}) \cdot \sigma_j}$$

$$J(\underline{x}, \underline{w}) = \min_{k,l,m,n} J_{k,l,m,n}(\underline{x}, \underline{w})$$

| parameters | actual | predicted | maximum likelihood |
|---|---|---|---|
| Δηfanout | -3 | -2.99 | -2.9 |
| ΔΓfan | 0 | 0 | -0.27 |
| Δηfanin | 0 | 0 | -0.33 |
| ΔΓhpc | -3 | 2.99 | 2.91 |
| Δηhpc | 1 | -1.03 | -0.41 |
| ΔΓhpt | 0 | 0 | -0.56 |
| Δηhpt | 0 | 0 | -0.11 |
| ΔΓlpt | 0 | 0 | -0.72 |
| Δηlpt | 0 | 0 | -0.2 |
| $\Delta C_D$ | 0 | 0 | -0.27 |
| setting parameters | | | |
| Wfe | 811.728 | 811.603 | 811.231 |
| P1 | 83.688 | 83.773 | 83.574 |
| T1 | 312.02 | 312.094 | 311.89 |
| | | RMS = 0.01 | RMS-0.39 |

Table 1 shows the comparison between typical results provided by the proposed diagnostic system and a more conventional "maximum likelihood" based optimisation minimising function with allowance for noise and biases in w without constraint on the number of fault-affected parameters. The boxes ☐ highlight the fault affected components (fanout and HPC).

The comparison shows that the GA-based approach produces a more accurate estimation and in particular the "smearing" effect (ie. the appearance of non-zero values for parameters which are not fault affected) is ruled avoided. Interpretation of the results is much easier as the fault affected components are easily isolated. It should be noted that with both approaches the estimation of the environment and power setting parameters is accurate.

TABLE 2

| | bias isolation | |
|---|---|---|
| | actual | predicted |
| W1a | 6.59 | 6.65 |
| P13 | 13.07 | 13.28 |
| T13 | 11.19 | 11.38 |
| P21 | 11.84 | 12.09 |
| T21 | 0.16 | 0.02 |
| W21 | 0.06 | 0.13 |
| P3 | 0.73 | 0.48 |
| T3 | 0.1 | 0.19 |
| T5 | 0.12 | 0.16 |
| P5 | 0.81 | 1.02 |
| F | 0.63 | 0.77 |
| Nh | 0.92 | 0.77 |
| Nl | 0.27 | .27 |

Table 2 shows the values of all the measurement parameters available for evaluation of the objective function in the case of faulty outer fan and HP compressor introduced above. In the considered case the W1a, P13, T13 and P21 are biased. Correctly, using the sensor validation approach discussed above, the GA identified the first 4 measurements as faulty (ie. biased) and excluded them from the evaluation of the objective function used to estimate x and w.

Figure 6:
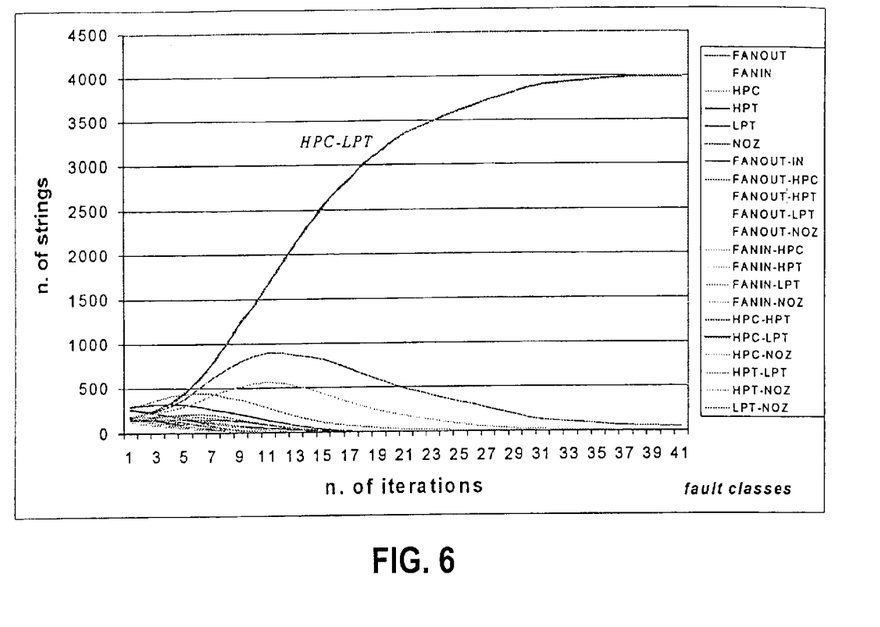
FIG. 6 illustrates convergence of the GA population for the example.

FIG. 6 shows the typical convergence of the population of strings to a single fault class. It shows how concentration on the faulty components is easily achieved after few iterations.

Table 3 summarises the average results for 150 test cases that have been run. In the table, RMS is the $$RMS = \sqrt{\frac{\sum_{j=1}^{N}(x_j - x_{estj})^2}{N}}$$

where N is the total number of performance parameters, $x_j$ and $X_{estj}$ are the actual and estimated values of the j-th performance parameter respectively. $e_1, e_2$ and $e_3$ are the average errors of estimation of the ambient and power setting parameters, successful component classification (s.c.c.) and successful sensor classification (s.s.c.) are the percentage of correct identification of faulty engine components and sensors respectively. The results show the high level of accuracy achieved, especially when data are analysed in the light of the overall number of biases including the three biased environment and power parameters as well as the number of assumed biased measurement parameters indicated in the table (5 and 7 respectively out of 16 measurements).

As expected, an increase in the number of biases produces larger estimation errors in terms of RMS and $e_1, e_2, e_3$.

An increase in the number of faulty components also produces larger estimation errors. It is reminded that a larger value of $(N_{perf}+P)/(M-M_{bias})$ implies less relative redundancy.

TABLE 3 test case results

|  |  | 2 biases | 4 biases |
|---|---|---|---|
| 1 faulty component |  |  |  |
| RMS |  | 0.037 | 0.106 |
| $e_1$ | (g/s) | 0.44 | 0.87 |
| $e_2$ | (kN/m$^2$) | 0.11 | 0.13 |
| $e_3$ | (K) | 0.18 | 0.23 |
| s.c.c. | (%) | 93.2 | 95.2 |
| s.c.c. | (%) | 98.3 | 97.6 |
| 2 faulty components |  |  |  |
| RMS |  | 0.181 | 0.272 |
| $e_1$ | (g/s) | 0.86 | 1.46 |
| $e_2$ | (kN/m$^2$) | 0.22 | 0.27 |
| $e_3$ | (K) | 0.32 | 0.38 |
| s.c.c. | (%) | 98.1 | 96.3 |
| s.c.c. | (%) | 91.9 | 91.7 |

Conversely, the capability to isolate faulty engine components and sensors does not generally seem to be dependent on the number of biases. The percentages of successful component classification show how much the "smearing" effect has been reduced. The better s.c.c. performance provided in the two faulty component cases is due to a number of runs where a single actually faulty component has been identified, but a small deterioration has wrongly been found in the nozzle as well. Usually these errors affect the estimation RMS only marginally.

It is worthwhile to point out that even though any fault relating to a single faulty component can be represented by a string of a two component fault class provided that the fault free component's performance parameters are zero, this occurrence is very rare except for the nozzle. Whereas the GA automatically identifies during the convergence whether one or two engine components are faulty, the number of supposedly biased measurements has to be set since the beginning.

If the actual biased measurements are more than the assumed ones ($M_{bias}$), then the optimiser is likely to converge to an incorrect solution due to the effect of the undetected biases. On the contrary, if $M_{bias}$ is larger than the number of actual biases, the optimiser is likely to estimate the engine faults correctly, because the biased measurements will be isolated together with other fault-free sensors in order to get the most consistent solution. $M_{bias}$ should be chosen on the basis of specific knowledge about the typical occurrence of sensor faults for the given engine-sensor suite. In the considered case of test bed for a two spool development engine, occurrence of faults in more than two sensors has to be regarded as unlikely. However, the choice of $M_{bias}$ is usually not crucial, because the number can safely be chosen to overestimate the real number of biases.

If no clue about a good choice of $M_{bias}$ is available, a sensible approach is to run a number of optimisations with different values of $M_{bias}$. For every value of $M_{bias}$ an average value can be fixed, which represents the expected magnitude of the optimised objective function when no bias has gone undetected. Comparison of the results allows an educated guess of the actual number of biases to be made.

The results shown in Table 3 confirm that the optimiser performs well even with a relatively large number of biases. Good performance should be achieved as long as relative redundancy is ensured. This condition is usually satisfied in comprehensively instrumented development engine test beds. Pass-off tests are usually dependent on a much more restricted number of sensors and then the Multiple Operating Point Analysis approach discussed below should be used to maximise the amount of information extractable from the sensor suite.

More specifically, the above approach, using measurements taken from a single operating point of the gas turbine tends to give accurate results so long as the number of measurements is more than the number of performance parameters and operating parameters to be determined. However, when the number of measurements is very low and/or the engine has a large number of components, especially if the number of measurements is less than the number of performance and operating parameters to be estimated the method cannot be used satisfactorily. As already discussed above, this problem can be addressed if lack of information from fewer measurements can be substituted with other relevant information. In particular, use of information available from different operating points can be used to overcome this deficiency of information available from sensors. This technique is known as multiple operating point analysis (MOPA).

Solution of the multiple operating point analysis is more complex than the single operating point analysis. The additional problems for MOPA are due to the large number of environment and power setting parameters and the complication of the topology that they cause thereby making the objective function even more difficult to optimize. Also the selection of the operating points must be considered. This is because the technique's underlying assumption is that changing operating condition does not modify the value of the performance parameter variation (ie. delta value x), whereas a different working point means different aerodynamic conditions and in this sense efficiencies and flow capacities can significantly change with the operating condition. The deviation can be supposed small provided the power settings are close to each other, but the power settings (ie. operating points) should not be so close that they become effectively the same, since then no additional information is available from the measurements.

As already noted above, one approach to MOPA is to extend the single operating point case by summing multiple single objective functions:

$$J_{k,l}(\underline{x}, \underline{W}) = \sum_{i=1}^{L} \sum_{\substack{j=1 \\ j \neq k,l}}^{M} \frac{|z_j^{(i)} - h_j(\underline{x}, \underline{w}^{(i)})|}{z_{odj}(\underline{w}^{(i)}) \cdot \sigma_j}$$

where: L is the number of operating points.

This introduces greater redundancy than the single operating point case, giving a relative redundancy index of:

$$R = \frac{L \cdot (M - M_{bias})}{N_{perf} + L \cdot P}$$

Figure 7:
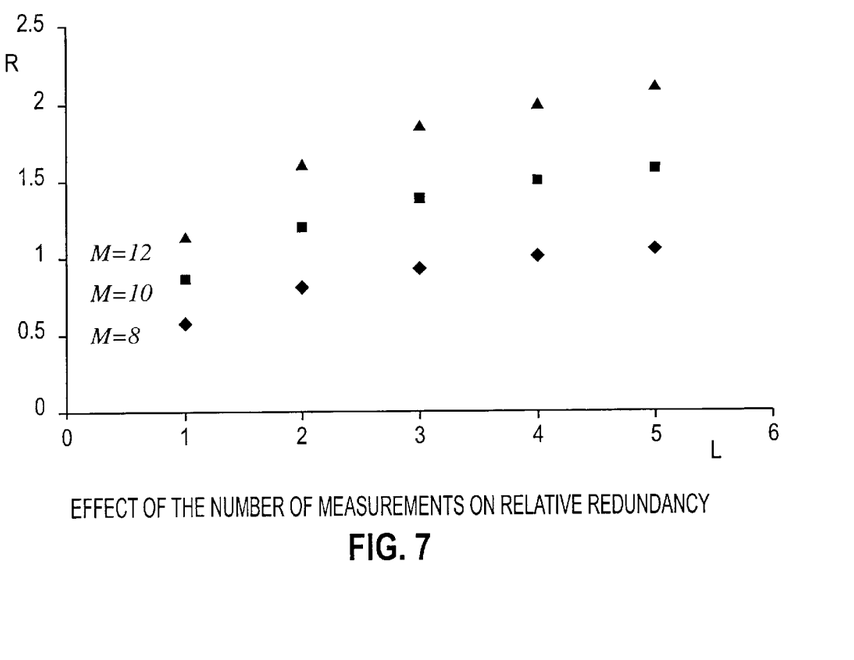
FIG. 7 shows the effect on "relative redundancy" of the multiple operating point approach.

Since the accuracy of the diagnostic technique increases with increased relative redundancy, the use of more operating points should lead to better accuracy. However, due to the approximate nature of R due to noise and non-linearity, the graph obtained by plotting R with respect to the number of operating points (FIG. 7) needs to be viewed in a statistical sense. In particular the following points should be considered:

1. Reduction in the rate of increase of the relative redundancy index reduces with increasing number of operating points 2. Very high computational resources necessary to evaluate the objective function increase with the number of operating points. When L=5 an evaluation may require a time of at least 5 times longer than with a single operating point.
3. A very large number of operating points is likely to cover a rather wide area in the component maps. Therefore, the assumption of constant performance parameter variations is less acceptable.
4. The objective function becomes harder to optimise as the number of points increases.

FIG. 7 shows that the gains achievable up to 3 operating points are significant and then the relative advantage in terms of accuracy and computation effort are lost.

The idea of multiobjective optimisation of objective functions based on the simple summation of each of the operating points is attractive due to its efficiency in terms of computation time. However, possible drawbacks of a simple summation exercise are the inability to generate proper pareto optimal solutions in the presence of non-convex search spaces and also, depending on the importance of each objective function, the requirement of assigning the appropriate weights to the different operating points. Another method of optimising would be to treat each operating point as a separate objective function and carry out Pareto based optimisation. The concept of Pareto optimality can be summarised thus: The family of solutions of a multi-objective optimization problem is composed of all those elements of the search space, which are such that the components of the corresponding objective vectors cannot be all simultaneously improved. The corresponding set of objective vectors is called the non-dominated set.

Various different techniques have been proposed for Pareto optimisation with GA's. They include a technique proposed by Fonseca and Fleming (1993): *"Genetic algorithms for multiobjective optimization: Formulation, discussion and generalisation"*, Proceedings of the fifth international conference on genetic algorithms, San Mateo Calif. pp 416–423 (incorporated herein by reference) which relies on assigning ranks to various individuals corresponding to the number of individuals in the current population by which it is dominated. Non-dominated individuals are, therefore, all assigned the same rank, while dominated ones are penalized according to the population density in the corresponding region of the trade-off surface. The algorithm proceeds by sorting the population according to the multi-objective ranks previously determined. Fitness is assigned by interpolating, e.g., linearly, from the best to the worst individuals in the population, and then averaging it between individuals with the same multi-objective rank.

Srinivas and Deb 1994: *"Multiobjective optimization using nondominated sorting in genetic algorithms"*, Journal of Evolutionary Computation, Vol. 2, No. 3 (incorporated herein by reference) have implemented a similar sorting and fitness assignment procedure, which is known as the Nondominated sorting algorithm (NSGA). NSGA varies from simple genetic algorithm only in the way the selection operator works. The crossover and mutation operators remain as usual. Before the selection is performed, the population is ranked on the basis of an individual's non-domination. The nondominated individuals present in the population are first identified from the current population. Then, all these individuals are assumed to constitute the first nondominated front in the population and assigned a large dummy fitness value. The same fitness value is assigned to give an equal reproductive potential to all these nondominated individuals. In order to maintain diversity in the population, these classified individuals are then shared with their dummy fitness values. Sharing is achieved by performing selection operation using degraded fitness values, which are obtained by dividing the original fitness value of an individual by a quantity proportional to the number of individuals around it. This causes multiple optimal points to coexist in the population. After sharing, these nondominated individuals are ignored temporarily to process the rest of population in the same way to identify individuals for the second nondominated front. These new set of points are then assigned a new dummy fitness value which is kept smaller than the minimum shared dummy fitness of the previous front. This process is continued until the entire population is classified into several fronts. The population is then reproduced according to the dummy fitness values. Since individuals in the first front have the maximum fitness value, they always get more copies than the rest of population.

Horn and Nafpliotis 1993: *"Multiobjective optimization using niched pareto genetic algorithms"*, IlliGAL Report 93005, University of Illinois at Urbana-Champaign, Urbana, Ill., USA (incorporated herein by reference) have proposed tournament selection based on Pareto dominance. They used a Pareto domination tournament instead of nondominated sorting and ranking selection method in solving multi-objective optimization problems. In this method, a comparison set comprising of a specific number (t dom) of individuals is picked at random from the population at the beginning of each selection process. Two random individuals are picked from the population for selecting a winner in a tournament selection according to the following procedure. Both individuals are compared with the members of the comparison set for domination with respect to the objective functions. If one of them is nondominated and the other is dominated, then the nondominated point is selected. On the other hand, if both are either nondominated or dominated, a niche count is found for each individual in the entire population. The niche count is calculated by simply counting the number of points in the population within a certain distance ($\sigma$ share) from an individual. The individual with least niche count is selected.

As with the embodiment discussed above, the GA used for the MOPA approach, whether summation or pareto optimisation, is tailored to the specific task at hand. Its main features are the following:

1. The objective function that has to be optimised is a function of the performance parameter vector (efficiencies and flow capacities) and the environment and power setting parameter vector (e.g. ambient pressure and temperature and fuel flow).
2. The population is initialised randomly within constraints of −/+3% for the flow capacities and 0–3% for the efficiencies. This is done by using a random number generator.
3. The initial population is then divided into fault classes, some of them will represent faults in a single engine component, others faults affecting two components. These classes are then processed by the three principle operators of the genetic algorithms, i.e. selection, crossover and mutation.
4. The selection operator uses the Stochastic Universal Sampling algorithm. Selection is based on fitness value, i.e. those strings that have a high fitness will get selected for the next generation and others will die out. The selection is extended to the entire population. After a few iterations, the competition is over as the whole population is made of a single fault class. Concentration on faults in one or two engine components is then achieved.

5. The crossover operator is applied to strings which are members of the same fault class. Crossmating between different fault classes is not allowed.
6. Mutation, which is the last operator to be applied reduces in size as the generations progress and is constrained to mutate only the fault affected parameters within a fault class. Mutation, when applied adds or substracts a random value from the fault affected parameters, whilst ensuring that the maximum constraints lie ±3% for flow functions and 0.3% for efficiencies) are satisfied.
7. The occurrence of both crossover and mutation are based on probability, which are set at the beginning of the iterations. For the diagnostic system the probabilities of crossover are 0.8 and that of mutation 0.2.

The diagnostic system of this embodiment uses an optimisation technique based on pareto optimality and has been tailored for Gas turbine analysis. The main operators of the GA i.e. the reproduction, crossover and mutation are all used. The fitness is calculated based on levels. The entire population is compared with each other for pareto optamility and the best individuals of the population (ie. those having the lowest values of objective function) are assigned a level 1. These are then taken out and the remainder of the population compared with each other and the best individuals assigned to level 2. This procedure is continued until all the individuals in the population have been assigned a level. The fitness for reproduction/selection is then assigned non-linearly in such a way that the population members in level 1 receive the highest fitness.

$$f(i) = 1 \div (\text{Level}(i)) \quad (6)$$

where: f=fitness of $i^{th}$ string
level=level of $i^{th}$ string

Thus the strings in level one are given the highest chance of selection for further generation and the ones in the last level the least chance. After a fixed number of iterations/generations, decided by the operator, the final solution is taken to be the individual from the first level whose x and w values result in the lowest value of a summation of the individual objective function values for each operating point.

The sensor validation technique discussed above can be applied to MOPA also. That is to say, failed sensors can be detected and isolated by using the fact that once the minimum objective function value has been achieved, the difference between the actual and the estimated measurements would be large for faulty sensors. Thus the predetermined number of measurements with the largest value contributing to the objective function value would be the faulty sensors. These measurements are then removed for evaluating the objective function.

It is assumed that here the same sensors will be fault affected for the measurements at different operating points. It is felt that the measurements for such purposes would be taken within a short period of time and the behaviour of sensors is not likely to change during this period. Therefore, only the first operating point need be used for the sensor validation.

EXAMPLE 2

The MOPA technique has been tested using data for the RB 199 engine, but it can be applied to any engine with a similar instrumentation set. A Rolls-Royce accurate non-linear steady state performance simulation model (RRAP) has been used as in Example 1.

The engine for which the technique has been developed, the RB 199 engine, is a three spool gas turbine and has 8 components (i.e. fan outer, fan inner, intermediate pressure compressor (IPC), high pressure compressor (HPC), high, pressure turbine (HPT), intermediate pressure turbine (IPT), low pressure turbine (LPT) and nozzle) and for each component the flow capacities and efficiencies are the performance parameters of interest except for the nozzle for which it is the nozzle, discharge coefficient ($C_D$).

The engine has ten measurements, one of which (the fuel flow) is used as a power setting parameter. The other nine measurements are Fan entry total airflow, HP spool speed, LP spool speed, fan outer exit pressure and temperature, HPC exit pressure and temperature, IPC exit pressure, and thrust.

It should be borne in mind that there are no meaurements within the turbines and the analysis of the turbines therefore relies on data from the compressor. Also there is no measurement for the IP spool speed. The task of performance analysis is therefore made doubly difficult i.e. not only the measurements are less but also they are not what one would typically desire.

For comparison, the engine under study has been tested with different techniques that have been proposed, namely the single operating point analysis (SOPA), which was very successful for the EJ 200 (a well instrumented engine—see above), multiple operating point analysis where results were obtained by summation of the objective function (MOPA (sum)) and the MOPA using a pareto based optimisation technique (MOPA (pareto based)).

One or at most two components were assumed to be fault affected and one measurement was biased that was to be identified and isolated. A number of simulations were carried out for a variety of faults and measurement biases. These showed that the proposed method of MOPA with two operating points with the distance between these being neither far nor very close was the most successful in terms of the accuracy and the identification of the faulty sensors.

Table 4 shows, for one fault case of fan outer (−3% flow capacity (ΔΓ)) and HPC (−3% flow capacity) and −1% efficiency (Δη)), the comparison between the three different techniques for optimisation i.e. the SOPA, MOPA (sum) and MOPA (pareto based). The MOPA based techniques have used two operating points.

TABLE 4

| Parameter | Actual | SOPA | MOPA (sum) | Predicted MOPA (pareto based) |
|---|---|---|---|---|
| ΔΓ fan | −3 | −2.92 | −3 | −3 |
| Δη fanout | 0 | 0 | 0 | 0 |
| Δη fanout | 0 | −2.61 | −1.77 | 0 |
| ΔΓ IPC | 0 | 0 | 0 | 0 |
| Δη IPC | 0 | 0 | 0 | 0 |
| ΔΓ HPC | −3 | 0 | −1.31 | −2.98 |
| Δη HPC | −1 | 0 | −0.09 | −1.18 |
| ΔΓ HPT | 0 | 0 | 0 | 0 |
| Δη HPT | 0 | 0 | 0 | 0 |
| ΔΓ IPT | 0 | 0 | 0 | 0 |
| Δη IPT | 0 | 0 | 0 | 0 |
| ΔΓ LPT | 0 | 0 | 0 | 0 |
| Δη LPT | 0 | 0 | 0 | 0 |
| Δη Ca | 0 | 0 | 0 | 0 |

Environment and Power setting parameters

Operating point 1

| Wf | 620 | 660 | 660 |

TABLE 4-continued

| | | | |
|---|---|---|---|
| P ambient | 101.325 | 101.325 | 101.325 |
| T ambient | 288.15 | 288.15 | 288.15 |
| Operating point 2 | | | |
| Wf | — | 620 | 620 |
| P ambient | — | 101.325 | 101.325 |
| T ambient | — | 288.15 | 288.15 |
| RMS error- | 1.10 | 0.70 | 0.05 |

It is seen that the Pareto based technique is much better than the other two. It was only the pareto based method that could identify the faulty components and also the estimation for the power setting parameters was accurate.

Since the pareto based technique should be used for the diagnostic system, the next part of the study/testing involved the study of choice and number of operating points for the MOPA. For this the proposed method based on pareto optimality was used.

Table 5 shows a comparison of results obtained using the MOPA (pareto based) technique for a fault in an IPT and LPT of the order of reduction of 2% in flow capacities and efficiencies for each component. Simulated data for this fault was used to illustrate the effect of the distance between the operating points for the proposed technique. The three operating points differ from each other only with respect to the fuel flow. The other parameters are same and the fault was also implanted in the same sensor namely the fan entry total airflow. There are three cases: case 1, where the difference between the fuel flow is between 1–2%, case 2, where the difference is 6% and case 3, where the difference is 15–17%. It is seen that for the case where the difference in the fuel flow was around 6% the accuracy was high and also the correct faulty sensor was identified. For the other two cases not only was the accuracy very low but also the faulty sensor could not be identified. It is thus seen that there is an optimum difference between the operating points i.e. neither very close to each other nor very far away.

TABLE 5

| Parameter | Actual Op. Point Close | Op. Point away | Predicted Op. Point far away |
|---|---|---|---|
| $\Delta\Gamma$ fan | 0 | 0 | 0 | 0 |
| $\Delta\eta$ fanout | 0 | 0 | 0 | 0 |
| $\Delta\eta$ fanout | 0 | 0 | 0 | 0 |
| $\Delta\Gamma$ IPC | 0 | 0 | 0 | 0 |
| $\Delta\eta$ IPC | 0 | 0 | 0 | 0 |
| $\Delta\Gamma$ HPC | 0 | 0 | 0 | −0.97 |
| $\Delta\eta$ HPC | 0 | 0 | 0 | −1.94 |
| $\Delta\Gamma$ HPT | 0 | 0 | 0 | 2.12 |
| $\Delta\eta$ HPT | 0 | 0 | 0 | −1.32 |
| $\Delta\Gamma$ IPT | −2 | −2.09 | −2.05 | 0 |
| $\Delta\eta$ IPT | −2 | −0.21 | −2.32 | 0 |
| $\Delta\Gamma$ LPT | −2 | −2.99 | −2.04 | 0 |
| $\Delta\eta$ LPT | −2 | −2.92 | −2.07 | 0 |
| $\Delta\eta$ Ca | 0 | 0 | 0 | 0 |
| Environment and Power setting parameters | | | |
| Operating point 1 | | | |
| Wf | 630 | 660 | 660 |
| P ambient | 101.32 | 101.32 | 101.32 |
| T ambient | 288.15 | 288.15 | 288.15 |
| Operating point 2 | | | |
| Wf | 620 | 620 | 560 |
| P ambient | 101.32 | 101.32 | 101.32 |
| T ambient | 288.15 | 288.15 | 288.15 |
| RMS error- | 0.60 | 0.09 | 1.38 |

This suggests that there may be little or no benefit as the number of operating points increase beyond two, because it might be difficult to choose operating points with an optimum distance between them.

Thus, it is preferred to use two operating points with a difference of about 5–6% in their fuel flow for the MOPA approach, for relatively poorly instrumented engines. For better instrumented engines, the single operating point approach is preferred, since it is more efficient in terms of computational resources and time.

We claim:

1. A method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system, the method comprising:

selecting a maximum number $M_{bias}$ of fault effected measurements, and optimising an objective function J(x,w) that gives a measure of the consistency between measured values of the measurement parameters z collected from the system and calculated values of the measurement parameters calculated using said function of the performance parameters and the operating parameters h(x,w), said optimisation including multiple evaluations of the objective function J(x,w), each time the objective function J(x,w) is evaluated during said optimisation, the method comprising calculating a plurality of possible values for the objective function, each possible value being calculated by determining the objective function with a different $M_{bias}$ of the measurement parameters eliminated, the value of the minimum one of said plurality of calculated possible values being assigned as the value of the objective function.

2. A method according to claim 1, wherein said function relating the measurement parameters to the performance and operating parameters is embodied in a performance simulation model designed to simulate the performance of the multi-component system to which the method is applied.

3. A method according to claim 1, wherein an Evolution Program is used for said optimisation of the objective function.

4. A method according to claim 3, wherein said Evolution Program is a Genetic Algorithm.

5. A method according to claim 3, wherein said optimisation of the objective function comprises the steps of:

(a) creating an initial population of strings, each string comprising a plurality of elements corresponding to the performance parameters x and operating parameters w, values being assigned to the string elements representing estimated values of said parameters;

(b) evaluating the objective function for each of the strings in the population and, on the basis of this evaluation, assigning a fitness value to each string; and (c) creating a next generation population of strings using a selection operator and at least one of a cross-over operator and a mutation operator, the selection operator employing the assigned fitness values to determine the strings that survive to the next generation;

wherein at the outset of the method an assumed maximum number of fault affected components is set and, based on this, a series of fault classes defined corresponding to possible outcomes in terms of faulty components;

each of the strings of the initially created population being assigned to one of the fault classes, the values assigned to the elements of strings in a fault class representing performance parameters being constrained to only indicate fault affected values for performance parameters defining the performance of the respective fault affected component or components of the class; and during creation of subsequent generation populations, the cross-over operator, if used, being constrained to operate on pairs of strings from the same fault class, and the mutation operator, if used, being constrained so that it does not operate on string elements representing performance parameters other than those performance parameters associated with the fault affected components within a class.

6. A method according to claim 5, wherein said selection operator is applied across the complete population of strings in all of the fault classes.

7. A method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system, the method comprising:

optimising an objective function J(x,w) which gives a measure of the consistency between measured values of the measurement parameters z collected from the system and calculated values of the measurement parameters calculated using said function of the performance parameters and the operating parameters h(x,w), said optimisation being an Evolutionary Program based method comprising the steps of:

(a) creating an initial population of strings, each string comprising a plurality of elements corresponding to the performance parameters x and operating parameters w, values being assigned to the string elements representing estimated values of said parameters;

(b) evaluating the objective function for each of the strings in the population and, on the basis of this evaluation, assigning a fitness value to each string; and (c) creating a next generation population of strings using a selection operator and at least one of a cross-over operator and a mutation operator, the selection operator employing the assigned fitness values to determine the strings that survive to the next generation;

wherein at the outset of the method an assumed maximum number of fault affected components is set and, based on this, a series of fault classes defined corresponding to possible outcomes in terms of faulty components;

each of the strings of the initially created population being assigned to one of the fault classes, the values assigned to the elements of strings in a fault class representing performance parameters being constrained to only indicate fault affected values for performance parameters defining the performance of the respective fault affected component or components of the class; and during creation of subsequent generation populations, the cross-over operator, if used, being constrained to operate on pairs of strings from the same fault class, and the mutation operator, if used, being constrained so that it does not operate on string elements representing performance parameters other than those performance parameters associated with the fault affected components within a class.

8. A method according to claim 7, wherein said selection operator is applied across the complete population of strings in all of the fault classes.

9. A method according to claim 7, wherein steps (b) and (c) of the optimisation are sequentially repeated a plurality of times.

10. A method according to claim 9, further comprising employing a local search algorithm to periodically refine the better strings in the population.

11. A method according to claim 7, further comprising:

selecting a maximum number $M_{bias}$ of fault effected measurements, each time the objective function J(x,w) is evaluated during said optimisation, the method comprising calculating a plurality of possible values for the objective function, each possible value being calculated by determining the objective function with a different $M_{bias}$ of the measurement parameters eliminated, the value of the minimum one of said plurality of calculated possible values being assigned as the value of the objective function.

12. A method according to claim 7, wherein:

said measurement parameters z are provided for two or more different operating points of said system, step (b) of said optimisation comprising evaluating the objective function for each of said strings for each of said two or more operating points.

13. A method according to claim 12, wherein for each said string the calculated values of the objective function are combined, the fitness value assigned to the string being assigned on the basis of the combined objective function values.

14. A method according to claim 12, wherein said optimisation comprises a pareto-based approach.

15. An evolution Program based search or optimisation method for solving a problem, comprising the steps of:

(a) creating an initial population of strings, each string representing a possible solution to the problem;

(b) evaluating the problem for each of the strings in the population and, on the basis of this evaluation, assigning a fitness value to each string; and (c) creating a next generation population of strings using a selection operator and at least one of a cross-over operator and a mutation operator, the selection operator employing the assigned fitness values to determine the strings that survive to the next generation;

wherein said strings are categorised at the outset of the method, in accordance with a pre-selected characteristic of said strings, to form a plurality of sub-populations comprising strings of the having the same value of said pre-selected characteristic; and during creation of subsequent generation populations, the cross-over operator, if used, being constrained to operate on pairs of strings from the same sub-population, and the mutation operator, if used, being constrained to ensure that the strings of each sub-population retain their initial value of said pre-selected characteristic.

16. A diagnostic system for estimating the performance of and/or detecting faults in components of a multi-component system, the performance of each component in the multi-component system being defined by one or more performance parameters x, and the performance parameters x being related to measurement parameters z which can be expressed as a function h( ) of the performance parameters x and operating parameters w defining an operating condition of the multi-component system, the diagnostic system comprising:

means for inputting and storing measured values of the measurement parameters z collected from the system, means for storing a maximum number $M_{bias}$ of fault affected measurements, means for calculating calculated values of the measurement parameters using said function of the performance parameters and the operating parameters h(x, w), and an optimiser for optimising an objective function J(x, w) that gives a measure of the consistency between said measured values of the measurement parameters z and said calculated values of the measurement parameters, said optimiser comprising means for calculating a plurality of possible values for the objective function, each possible value being calculated by determining the objective function with a different $M_{bias}$ of the measurement parameters eliminated, and means for assigning the value of the minimum one of said plurality of calculated possible values as the value of the objective function.

17. A diagnostic system according to claim 16, wherein said means for calculating calculated values of the measurement parameters comprises a performance simulation model designed to simulate the performance of the multi-component system.

18. A diagnostic system for estimating the performance of and/or detecting faults in components of a multi-component system, the performance of each component in the multi-component system being defined by one or more performance parameters x, and the performance parameters x being related to measurement parameters z which can be expressed as a function h( ) of the performance parameters x and operating parameters w defining an operating condition of the multi-component system, the diagnostic system comprising:

means for inputting and storing measured values of the measurement parameters z collected from the system, means for calculating calculated values of the measurement parameters using said function of the performance parameters and the operating parameters h(x, w), means for setting an assumed maximum number of fault affected components is set, means for defining a series of fault classes corresponding to possible outcomes in terms of faulty components; and an optimiser for optimising an objective function J(x, w) that gives a measure of the consistency between said measured values of the measurement parameters z and said calculated values of the measurement parameters, said optimiser comprising Evolutionary Program means including:

(a) means for creating an initial population of strings, each string comprising a plurality of elements corresponding to the performance parameters x and operating parameters w, values being assigned to the string elements representing estimated values of said parameters and means for assigning each of said strings to a related fault class;

(b) means for evaluating the objective function for each of the strings in the population and, on the basis of this evaluation, assigning a fitness value to each string; and (c) means for creating a next generation population of strings using a selection operator and at least one of a cross-over operator and a mutation operator, the selection operator employing the assigned fitness values to determine the strings that survive to the next generation;

said means for creating the next generation comprising constraints for constraining the cross-over operator, if used, to operate on pairs of strings from the same fault class, and constraining the mutation operator, if used, so that it does not operate on string elements representing performance parameters other than those performance parameters associated with the fault affected components within a class.

19. A diagnostic system according to claim 18, wherein said means for calculating calculated values of the measurement parameters comprises a performance simulation model designed to simulate the performance of the multi-component system.

20. A diagnostic system according to claim 19, wherein said optimiser further comprises a local search algorithm for periodically refining selected strings in the population.

* * * * *